United States Patent [19]

Smyth et al.

[11] Patent Number: 5,819,222
[45] Date of Patent: Oct. 6, 1998

[54] TASK-CONSTRAINED CONNECTED SPEECH RECOGNITION OF PROPAGATION OF TOKENS ONLY IF VALID PROPAGATION PATH IS PRESENT

[75] Inventors: Samuel Gavin Smyth, Suffolk; Simon Patrick Alexander Ringland, Ipswich, both of United Kingdom

[73] Assignee: British Telecommunications public limited company, London, United Kingdom

[21] Appl. No.: 530,170

[22] PCT Filed: Mar. 31, 1994

[86] PCT No.: PCT/GB94/00714

§ 371 Date: Oct. 11, 1995

§ 102(e) Date: Oct. 11, 1995

[87] PCT Pub. No.: WO94/23425

PCT Pub. Date: Oct. 13, 1994

[30] Foreign Application Priority Data

Mar. 31, 1993 [EP] European Pat. Off. .............. 93302539
Jun. 10, 1993 [EP] European Pat. Off. .............. 93304503

[51] Int. Cl.⁶ ................................................. G10L 5/00
[52] U.S. Cl. ....................... 704/256; 704/243; 704/254; 704/252; 704/255
[58] Field of Search ................................ 395/2.68, 2.64, 395/2.52, 2.63, 2.49, 2.6, 2.5, 2.54

[56] References Cited

U.S. PATENT DOCUMENTS

| | | | |
|---|---|---|---|
| Re. 31,188 | 3/1983 | Pirz et al. ................................ | 395/2.61 |
| 4,348,553 | 9/1982 | Baker et al. ............................. | 395/2.5 |
| 4,783,804 | 11/1988 | Juang et al. ............................ | 395/2.54 |
| 4,803,729 | 2/1989 | Baker ....................................... | 395/2.5 |
| 4,829,578 | 5/1989 | Roberts ................................... | 704/233 |
| 4,837,831 | 6/1989 | Gillick et al. ........................... | 395/2.54 |
| 4,888,823 | 12/1989 | Nitta et al. .............................. | 704/249 |
| 4,980,918 | 12/1990 | Bahl et al. .............................. | 704/240 |
| 5,040,127 | 8/1991 | Gerson ................................. | 364/513.5 |
| 5,228,110 | 7/1993 | Steinbiss ................................. | 704/200 |
| 5,309,547 | 5/1994 | Niyada et al. .......................... | 704/238 |
| 5,388,183 | 2/1995 | Lynch ..................................... | 704/242 |
| 5,390,278 | 2/1995 | Gupta et al. ........................... | 395/2.52 |
| 5,524,169 | 6/1996 | Cohen et al. ........................... | 395/2.4 |
| 5,583,961 | 12/1996 | Pawlewski et al. ..................... | 395/2.5 |
| 5,621,859 | 4/1997 | Schwartz et al. ....................... | 395/2.65 |

FOREIGN PATENT DOCUMENTS

| | | |
|---|---|---|
| 0248377 | 12/1987 | European Pat. Off. . |
| 0474496 A3 | 3/1992 | European Pat. Off. . |
| 0518742 A1 | 12/1992 | European Pat. Off. . |
| 0535929 A2 | 4/1993 | European Pat. Off. . |

OTHER PUBLICATIONS

Lamel et al, "An Improved Endpoint Detector for Isolated Word Recognition", IEEE Transactions on Acoustics, Speech and Signal Processing, vol. 29, No. 4, Aug. 1981, New York, US, pp. 777–785.

IBM Techincal Disclosure Bulletin, vol. 34, No. 9, Feb. 1992, New York, US, pp. 267–269, "Method of Endpoint Detection".

Austin et al, "A Unified Syntax Direction Mechanism for Automatic Speech Recognition Systems Using Hidden Markov Models", ICASSP, vol. 1, May 23, 1989, Glasgow, pp. 667–670.

Young et al, "Token Passing" A Simple Conceptual Model for Connected Speech Recognition Syustems, Cambridge University Engineering Department, Jul. 31, 1989, pp. 1–23.

Kitano, An Experimental Speech–to–Speech Dialog Translation System, IEEE, June 1991, DM–Dialog, Carnegie Mellon University and NEC Corporation.

Primary Examiner—David R. Hudspeth
Assistant Examiner—Vijay B. Chawan
Attorney, Agent, or Firm—Nixon & Vanderhye P.C.

[57] ABSTRACT

A speech recognition system recognizes connected speech using a plurality of vocabulary nodes, at least one of which has an associated signature. In use, partial recognition paths are examined at decision nodes intermediate the beginning and end of the recognition path, each decision node having an associated set of valid accumulated signatures. A token received by a decision node is only propagated if the accumulated signature of that token is one of those in the set of valid accumulated signatures associated with that decision node.

29 Claims, 6 Drawing Sheets

─○─ TREE NETWORK WITH VARIOUS PRUNING THRESHOLD

─⊚─ REFERENCE TREE NETWORK

─□─ APPARATUS ACCORDING TO THE INVENTION WITH n LAYERS OF ALTERNATIVE PATHS

TASK-CONSTRAINED CONNECTED SPEECH RECOGNITION OF PROPAGATION OF TOKENS ONLY IF VALID PROPAGATION PATH IS PRESENT

RELATED APPLICATIONS

This application is related to commonly assigned copending applications: Ser. No. 08/094,268 filed Jul. 21, 1993 abandoned in favor of CIP 08/530,157 filed Nov. 21, 1995 and Ser. No. 08/525,730 filed Dec. 19, 1995.

BACKGROUND OF THE INVENTION

1. Field of the Invention

The present invention relates to connected speech recognition and in particular to a method and apparatus for applying grammar constraints to connected speech recognition. The present invention is of particular interest in the area of task-constrained connected word recognition where the task, for example, might be to recognise one of a set of account numbers or product codes.

2. Related Art

It is common in speech recognition processing to input speech data, typically in digital form, to a so-called front-end processor, which derives from the stream of input speech data a more compact, perceptually significant set of data referred to as a front-end feature set or vector. For example, speech is typically input via a microphone, sampled, digitised, segmented into frames of length 10–20 ms (e.g. sampled at 8 kHz) and, for each frame, a set of coefficients is calculated. In speech recognition, the speaker is normally assumed to be speaking one of a set of words or phrases. A stored representation of the word or phrase, known as a template or model, comprises a reference feature matrix of that word as previously derived from, in the case of speaker independent recognition, multiple speakers. The input feature vector is matched with the model and a measure of similarity between the two is produced.

Speech recognition (whether human or machine) is susceptible to error and may result in the misrecognition of words. If a word or phrase is incorrectly recognised, the speech recogniser may then offer another attempt at recognition, which may or may not be correct.

Various ways have been suggested for processing speech to select the best alternative matches between input speech and stored speech templates or models. In isolated word recognition systems, the production of alternative matches is fairly straightforward: each word is a separate 'path' in a transition network representing the words to be recognised and the independent word paths join only at the final point in the network. Ordering all the paths exiting the network in terms of their similarity to the stored templates or the like will give the best and alternative matches.

In most connected recognition systems and some isolated word recognition systems based on connected recognition techniques however, it is not always possible to recombine all the paths at the final point of the network and thus neither the best nor alternative matches are directly obtainable form the information available at the exit point of the network. One solution to the problem of producing a best match is discussed in "Token Passing: a Simple Conceptual Model for Connected Speech Recognition Systems" by S. J. Young, N. H. Russell and J. H. S. Thornton, Cambridge University Engineering Department 1989, which relates to passing packets of information, known as tokens, through a transition network designed to represent the expected input speech. In general terms "network" includes directed acyclic graphs (DAGs) and trees. A DAG is a network with no cycles and a tree is a network in which the only meeting of paths occurs conceptually right at the end of the network. A token contains information relating to the partial path travelled as well as an accumulated score indicative of the degree of similarity between the input speech and the portion of the network processed thus far.

As described by Young et al, at each input of a frame of speech to a transition network, any tokens that are present at the input of a node are passed into the node and the current frame of speech matched within the word models associated with those nodes. At the output of each node, a token is issued with updated partial path information and score (the token having "travelled" through the model associated with the node). If more than one token is presented to a node, only the best scoring token is propagated onwards through the network.

SUMMARY OF THE INVENTION

When the end of speech has been signalled (by an external device such as a pause detector), a single token will be present at the final node. From this token the entire path through the network can be extracted by tracing back along the path by means of the partial path information contained within the token to provide the best match to the input speech.

It is possible to construct a network enumerating all the possible word sequences, perhaps in the form of a tree. While this is relatively straightforward to construct, it becomes problematic as the recognition task size grows large. For example a tree network, representing 250,000 7-digit sequences might have a million nodes. If each node took 50 bytes of storage, the network would occupy 50 Mb. While the computational requirements of such a network can be contained by only maintaining a small portion of it active at any one time, the amount of memory needed to store the topology of the network remains unaffected. An alternative would be to build the network dynamically as required, but this would in itself impose a significant computational burden.

In accordance with the invention there is provided a speech recogniser comprising a network for modelling expected input speech, the network having a plurality of vocabulary nodes for processing input speech, each vocabulary node being associated with at least one word representation model operable to produce a first parameter indicating the degree of similarity between the input speech and speech deemed to be recognised;

comparing means for comparing the first parameters from distinct word representation models and, in response to this comparison, for determining the parameter to be propagated through the network;

and means for determining, at an output of the network, the parameter having the highest degree of similarity and the input speech deemed to be recognised;

characterised in that means are provided for allocating a signature to at least one of the vocabulary nodes;

in that means are provided for associating with each first parameter a second parameter representing the accumulated signatures of a path through the network;

and in that validation means are provided for validating that the second parameter associated with a first parameter is included in a valid set of second parameters, the first parameters being propagated through the network only when the associated second parameter is one of those in a set of valid second parameters.

Such a system replaces a full tree network with a very much smaller one. If the same example is considered as described above with respect to the prior art, the memory requirements for the network are likely to be under 2 Mbytes, a considerable saving.

In principle this technique could be applied to any recognition that can be implemented by use of a tree grammar. However the size of the second parameter and the speed with which it can be checked are likely to be the limiting factors in practice.

The term "word" herein denotes a basic recognition unit, which may be a word but equally well may be a diphone, phoneme, allophone etc. The word representation models may be Hidden Markov Models (HMMs), templates, or any other suitable word representation model. The processing which occurs within a model is irrelevant as far as this invention is concerned. Recognition is the process of matching an unknown utterance with a predefined transition network, the network having been designed to be compatible with what a user is likely to say.

Propagating only those first parameters which have valid associated second parameters will not guarantee optimal recognition accuracy as would be the case for an unpruned tree network. The invention applies a number of bottlenecks to restrict the number of paths active at any time making it comparable to a very severely pruned tree network, and in situations where there is plenty of processing power available, the reduction in storage requirements of the network is achieved at a cost in accuracy (from 92% down to 89%). On the other hand, when the processing power available is limited then a system according to the invention may offer both reduced memory requirements and increased accuracy.

The accuracy of the recognition results can be ameliorated by extending the network to process multiple alternative paths. Preferably, this is achieved by at least one of the vocabulary nodes of the network having more than one identical associated word model as described in our co-pending International application filed on 31$^{st}$ Mar. 1994 entitled "Speech Processing", claiming priority from European Applications No. 93303538.9 and 93304993.4 (corresponding to U.S. patent application 08/094,268 filed Jul. 21, 1993 and its CIP 08/530,157 filed Nov. 21, 1995) incorporated herein by this reference. This allows the recognition system to process multiple paths at the same time and so allows more than one recognition result to be obtained for each frame of input speech. The best scoring path having a valid accumulated signature may be processed by the first model of a node, the next best by the second and so on until either parallel models or incoming paths run out.

The accumulated signature may be used to identify the complete path, resulting in extra efficiency of operation as the tokens need not be traversed to determine the path identity. In this case the accumulated signature must be large enough uniquely to identify all paths.

For efficient operation of the system according to the invention, the signal processing of path signatures is preferably carried out in a single operation, thereby increasing processing speed.

Other aspects and preferred embodiments of the invention are as disclosed and claimed herein, with advantages that will be apparent hereafter.

The invention will now be described further, by way of example only, with reference to the accompanying drawings in which.

Figure 1:
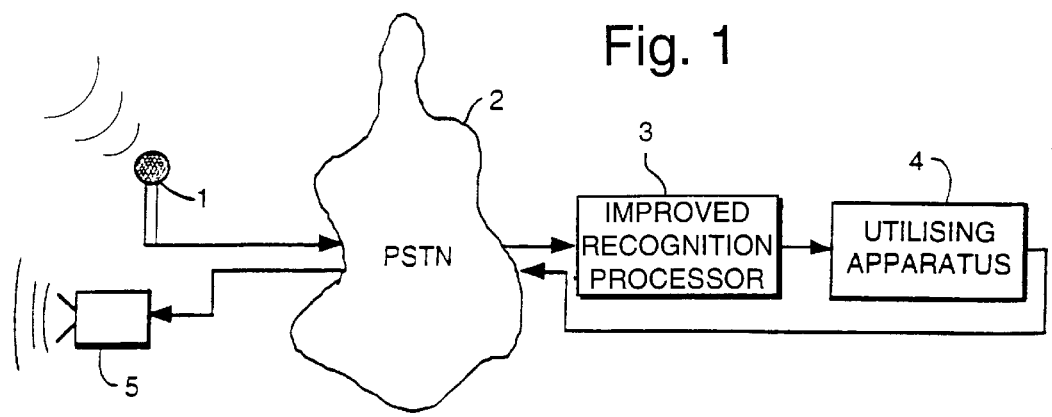
FIG. 1 shows schematically an application of a recognition system according to the invention in a telecommunications environment.

Referring to FIG. 1, a telecommunications system including speech recognition generally comprises a microphone 1, typically forming part of a telephone handset, a telecommunications network (typically a public switched telecommunications network (PSTN)) 2, a recognition processor 3, connected to receive a voice signal from the network 2, and a utilising apparatus 4 connected to the recognition processor 3 and arranged to receive therefrom a voice recognition signal, indicating recognition or otherwise of a particular word or phrase, and to take action in response thereto. For example, the utilising apparatus 4 may be a remotely operated banking terminal for effecting banking transactions.

In many cases, the utilising apparatus 4 will generate an auditory response to the speaker, transmitted via the network 2 to a loudspeaker 5 typically forming a part of the subscriber handset.

In operation, a speaker speaks into the microphone 1 and an analog speech signal is transmitted form the microphone 1 into the network 2 to the recognition processor 3, where the speech signal is analysed and a signal indicating identification or otherwise of a particular word or phrase is generated and transmitted to the utilising apparatus 4, which then takes appropriate action in the event of recognition of the speech.

Typically, the recognition processor 3 needs to acquire data concerning the speech against which to verify the speech signal, and this data acquisition may be performed by the recognition processor in a second mode of operation in which the recognition processor 3 is not connected to the utilising apparatus 4, but receives a speech signal from the microphone 1 to form the recognition data for that word or phrase. However, other methods of acquiring the speech recognition data are also possible.

Typically, the recognition processor 3 is ignorant of the route taken by the signal from the microphone 1 to and through the network 2; any one of a large variety of types and qualities of receiver handset may be used. Likewise, within the network 2, any one of a large variety of transmission paths may be taken, including radio links, analog and digital paths and so on. Accordingly, the speech signal Y reaching the recognition processor 3 corresponds to the speech signal S received at the microphone 1, convolved with the transfer characteristics of the microphone 1, link to network 2, channel through the network 2, and link to the recognition processor 3, which may be lumped and designated by a single transfer characteristic H.

Figure 2:
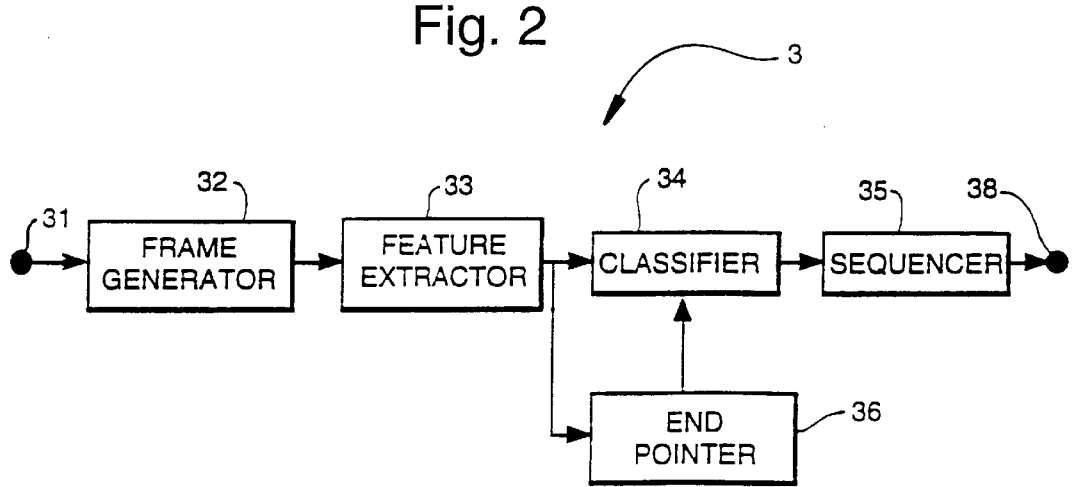
FIG. 2 is a block diagram showing schematically the functional elements of a recognition processor according to an embodiment of the invention.

Referring to FIG. 2, the recognition processor 3 comprises an input 31 for receiving speech in digital form (either form a digital network or from an analog to digital converter), a frame processor 32 for partitioning the succession of digital samples into a succession of frames of contiguous samples; a feature extractor 33 for generating from a frame of samples a corresponding feature vector; a classifier 34 receiving the succession of feature vectors and operating on each with a plurality of model states, to generate recognition results; an end pointer 36 for determining the end of speech, either by detecting the end of speech or after a period of silence, known as a 'time out'; a sequencer 35 which is arranged to receive the classification results form the classifier 34 and to determine the predetermined utterance to which the sequence of classifier output indicates the greatest similarity; and an output port 38 at which a recognition signal is supplied indicating the speech utterance which has been recognised.

Frame Generator 32

The frame generator 32 is arranged to receive speech samples at a rate of, for example, 8,000 samples per second, and to form frames comprising 256 contiguous samples, at a frame rate of 1 frame every 16 ms. Preferably, each frame is windowed (i.e. the samples towards the edge of the frame are multiplied by predetermined weighting constants) using, for example, a Hamming window to reduce spurious artifacts, generated by the frames edges. In a preferred embodiment, the frames are overlapping (for example by 50%) so as to ameliorate the effects of the windowing.

Feature Extractor 33

The feature extractor 33 receives frames from the frame generator 32 and generates, in each case, a set or vector of features. The features may, for example, comprise cepstral coefficients (for example, LPC cepstral coefficients or mel frequency cepstral coefficients as described in "On the Evaluation of Speech Recognisers and Databases using a Reference System", Chollet & Gagnoulet, 1982 proc. IEEE p2026), or differential values of such coefficients comprising, for each coefficient, the differences between the coefficient and the corresponding coefficient value in the preceding vector, as described in "On the use of Instantaneous and Transitional Spectral Information in Speaker Recognition", Soong & Rosenberg, 1988 IEEE Trans. On Acoustics, Speech and Signal Processing Vol. 36 No. 6 p871. Equally, a mixture of several types of feature coefficients may be used.

Finally, the feature extractor 33 outputs a frame number, incremented for each successive frame.

The frame generator 32 and feature extractor 33 are, in this embodiment, provided by a single suitably programmed digital signal processor (DSP) device (such as the Motorola DSP 56000, or the Texas Instruments TMC C 320) or similar device.

Classifier 34

Figure 3:
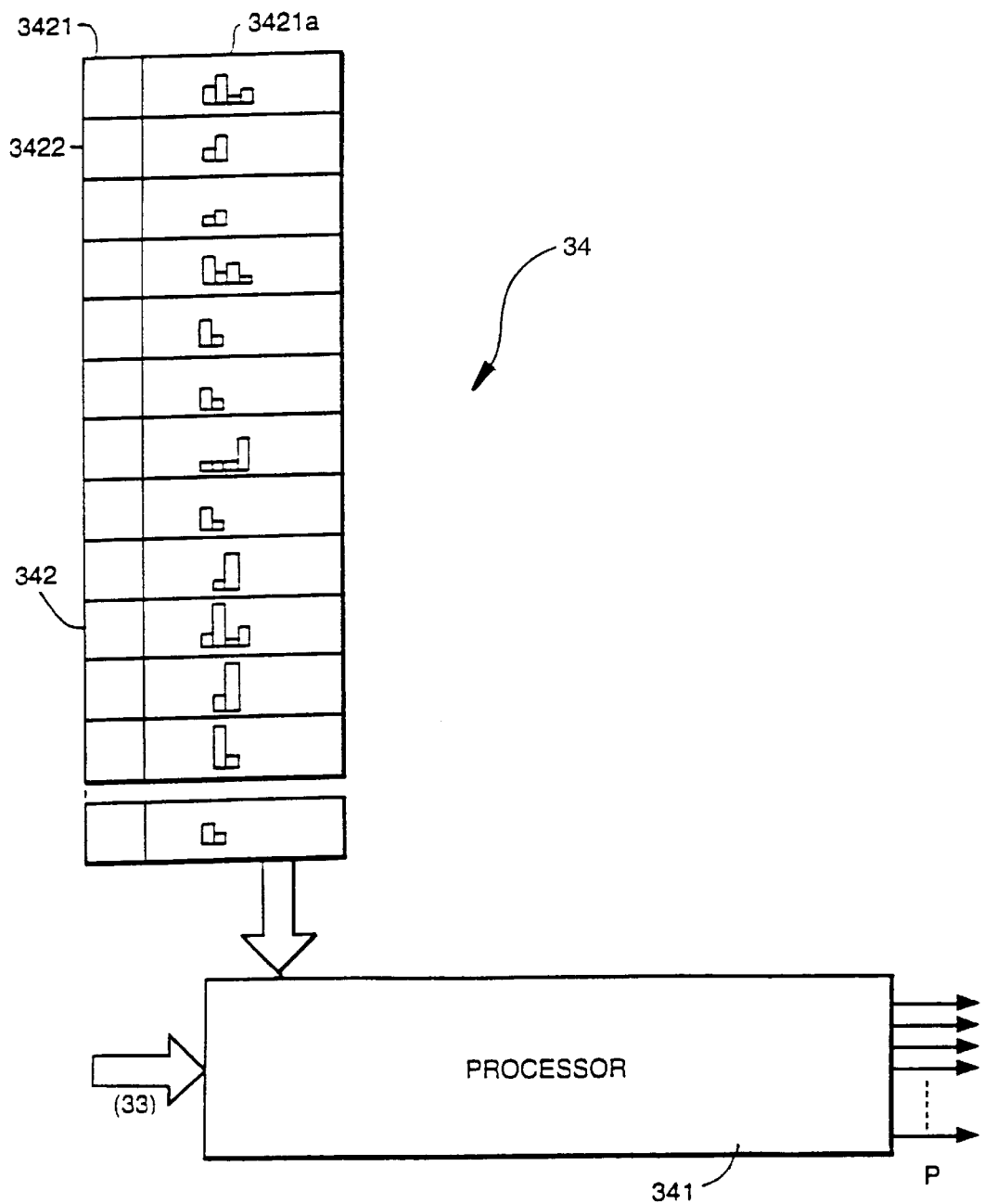
FIG. 3 is a block diagram indicating schematically the components of a classifier forming part of FIG. 2.

Referring to FIG. 3, in this embodiment, the classifier 34 comprises a classifying processor 341 and a state memory 342.

The state memory 342 comprises a state field 3421, 3422 . . . , for each of the plurality of speech states. For example, each allophone to be recognised by the recognition processor comprises 3 states, and accordingly 3 state fields are provided in the state memory 342 for each allophone.

The classification processor 34 is arranged to read each state field within the memory 342 in turn, and calculate for each, using the current input feature coefficient set, the probability that the input feature set or vector corresponds to the corresponding state.

Accordingly, the output of the classification processor is a plurality of state probabilities P, one for each state in the state memory 342, indicating the likelihood that the input feature vector corresponds to each state.

The classifying processor 341 may be a suitably programmed digital signal processing (DSP) device, may in particular be the same digital signal processing device as the feature extractor 33.

Sequencer 35

Figure 4:
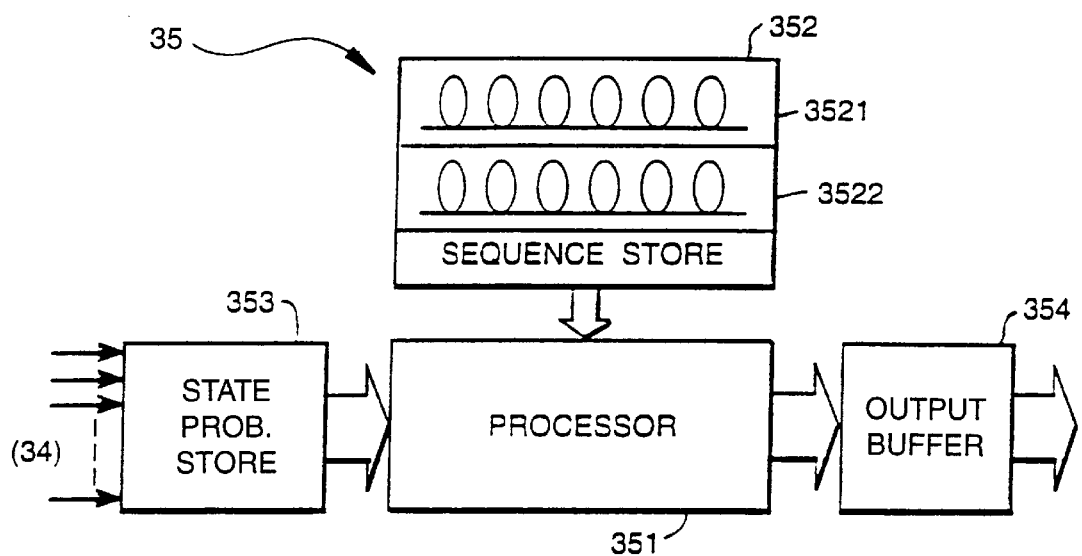
FIG. 4 is block diagram showing schematically the structure of a sequence parser forming part of the embodiment of FIG. 2.

Referring to FIG. 4, the sequencer 35 in this embodiment comprises a state sequence memory 352, a parsing processor 351, and a sequencer output buffer 354.

Also provided is a state probability memory 353 which stores, for each frame processed, the state probabilities output by the classifier processor 341. The state sequence memory 352 comprises a plurality of state sequence fields 3521; 3522 . . . , each corresponding to a word or phase sequence to be recognised consisting of a string of allophones.

Figure 5:
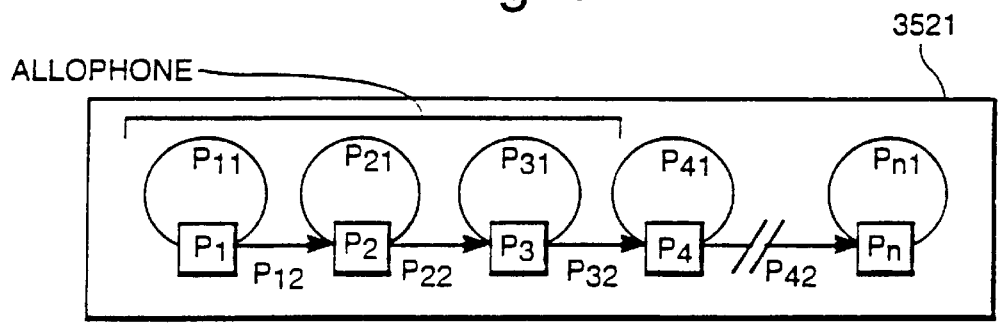
FIG. 5 shows schematically the content of a field within a store forming part of FIG. 4.

Each state sequence in the state sequence memory 352 comprises, as illustrated in FIG. 5, a number of states $P_1, P_2, \ldots P_N$ (where N is a multiple of 3) and, for each state, two probabilities; a repeat probability ($P_{11}$) and a transition probability to the following state ($P_{12}$). The states of the sequence are a plurality of groups of three states each relating to a single allophone. The observed sequence of states associated with a series of frames may therefore comprise several repetitions of each state $P_1$ in each state sequence model 3521 etc; for example:

| Frame Number | 1 | 2 | 3 | 4 | 5 | 6 | 7 | 8 | 9 | ... | Z | Z+1 |
|---|---|---|---|---|---|---|---|---|---|---|---|---|
| State | P1 | P1 | P1 | P2 | P2 | P2 | P2 | P2 | P2 | ... | Pn | Pn |

The parsing processor 351 is arranged to read, at each frame, the state probabilities output by the classifier processor 341, and the previous stored state probabilities in the state probability memory 353, and to calculate the most likely path of states to date over time, and to compare this with each of the state sequences stored in the state sequence memory 352.

The calculation employs the well known Hidden Markov Model method described in the above referenced Cox paper. Conveniently, the HMM processing performed by the parsing processor 351 uses the well known Viterbi algorithm. The parsing processor 351 may, for example, be a microprocessor such as the Intel$^{(TM)}$ i-486$^{(TM)}$ microprocessor or the Motorola$^{(TM)}$ 68000 microprocessor, or may alternatively be a DSP device (for example, the same DSP device as is employed for any of the preceding processors).

Accordingly for each state sequence (corresponding to a word, phrase or other speech sequence to be recognised) a probability score is output by the parser processor 351 at each frame of input speech. For example the state sequences may comprise the names in a telephone directory. When the end of the utterance is detected, a label signal indicating the most probable state sequence is output from the parsing processor 351 to the output port 38, to indicate that the corresponding name, word or phrase has been recognised.

The parsing processor 351 comprises a network which is specifically configured to recognise certain phrases or words for example a string of digits.

Figure 6:
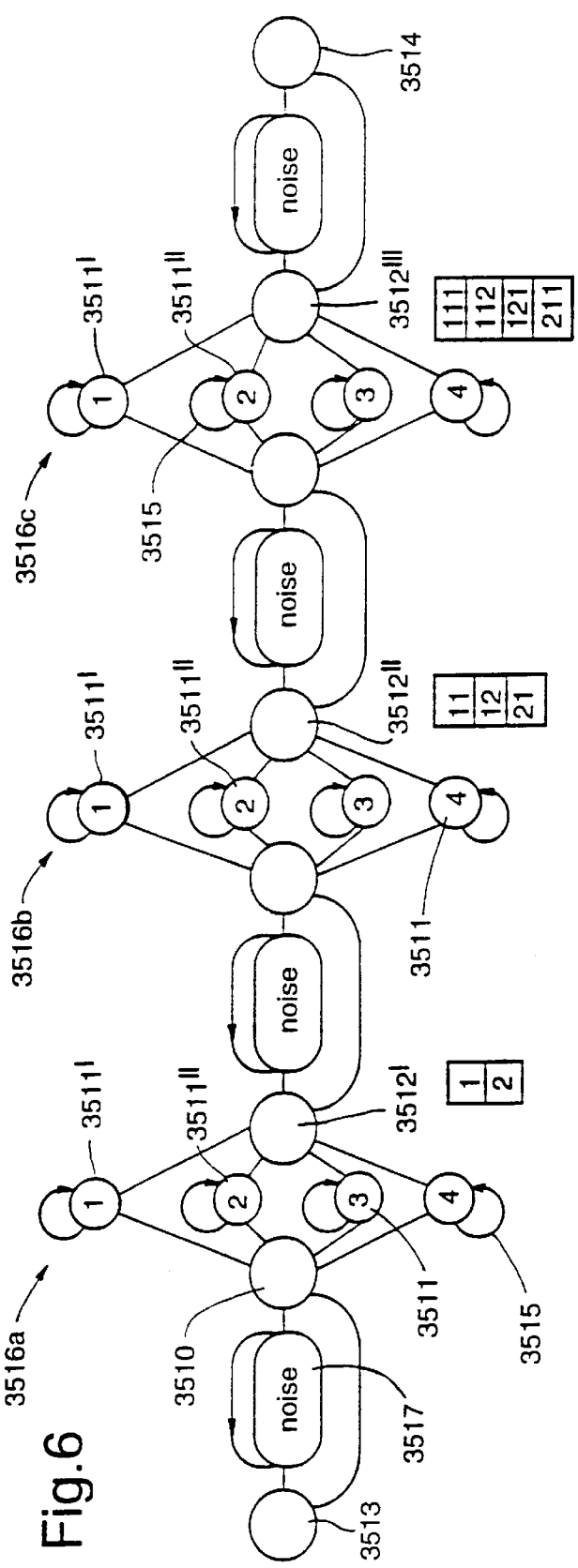
FIG. 6 is a schematic representation of one embodiment of a recognition network applicable with the processor of the sequence parser of FIG. 4.

FIG. 6 represents an embodiment of a network of the parsing processor 351 configured to recognise strings of three digits. The grey nodes 3510 are null nodes in the network; the white nodes are active nodes which may be divided into vocabulary nodes 3511 with associated word representation models, indicated by loops 3515, for matching incoming speech, noise nodes 3517 which represent arbitrary noise and decision nodes 3512. A decision node 3512 as defined herein refers to a node in the network which has more than one incoming path from previous vocabulary nodes.

Each vocabulary node 3511 is assigned a signature, for example the nodes 3511' representing the digit 1 are assigned a signature '1', the nodes 3511" representing the digit 2 are assigned a signature '2' and so on. Each decision node 3512 has an associated set of valid signatures. As tokens pass through the models, the accumulated signature associated with each token is modified to reflect the extended path through the network. A signature accumulation function could take many forms, subject to the constraint that it must provide unique accumulated signatures for those paths which are considered different in terms of the recognised output. An example signature accumulation function is given below:

$$S_{out}=S_{in} \times M-m$$

$$S_o=O$$

where $S_{out}$=the accumulated signature after passing through the node $S_{in}$=the accumulated signature input to the node $S_o$=initial accumulated signature from start node M—the number of different vocabulary models (e.g. 10 for digits 0 to 9)

m—the signature of the current vocabulary node.

According to this signature accumulation function, for a sequence of up to nine words, an accumulated signature presented at the output node of a network configured to recognise up to nine words, may therefore range from 000000000 to 999999999. Thus a maximum of 32 bits is needed for the accumulated signature.

The additional cost in validating the signatures is very low. Using a binary search on a list of roughly 100,000 signatures for sequences of seven digits, incurred only a 2% increase in overall processing requirements.

At the start of parsing, a single empty token is passed into a network entry node 3513. Since this is a null node, the token is passed to the next node, a noise node 3517. The input frame is matched in the noise model (not shown) of this node and an updated token produced at the output. This token is then passed to the next active nodes i.e. the first set of vocabulary nodes 3516*a* each having an associated word model indicated by the loop 3515. Each vocabulary node 3511 of the first set of vocabulary nodes 3516*a* processes the frame of speech in its associated word model 3515 and products an updated token. At the end of each time frame, the updated tokens are presented to the first decision node 3512'. The decision nodes of the network are associated with a set of valid signatures and a path will only be propagated by such a 'constrained' node if a token having one of these signatures is presented.

For instance, say the network of FIG. 6 is constrained to recognise the four following numbers only: 111, 112, 121, 211. To achieve this, the signatures of the tokens entering a constrained node, eg the first decision node 3512', are examined. If the signature of a token is 1 or 2, the highest scoring such token is propagated onto the next nodes. Otherwise, the token is discarded and the path is not propagated any further. The next constrained node is the decision node 3512" after the second set of vocabulary nodes 3516*b*. This null node is constrained to propagate only a token having a signature 11, 12 or 21. The decision node 3512''' after the third set of vocabulary nodes 3516*c* is constrained to propagate only a token having the signature 111, 112, 121 or 211. Such an arrangement significantly reduces the necessary processing and allows for a saving in the memory capacity of the apparatus. In practice, a 32 bit signature has proved to be suitable for sequences of up to 9 digits. A 64 bit signature appears suitable for a 12 character alphanumeric string.

It should be clear that the signatures of the tokens are not updated after processing by the null nodes 3510 or the noise nodes 3517 since these nodes do not have assigned signatures.

Figure 7:
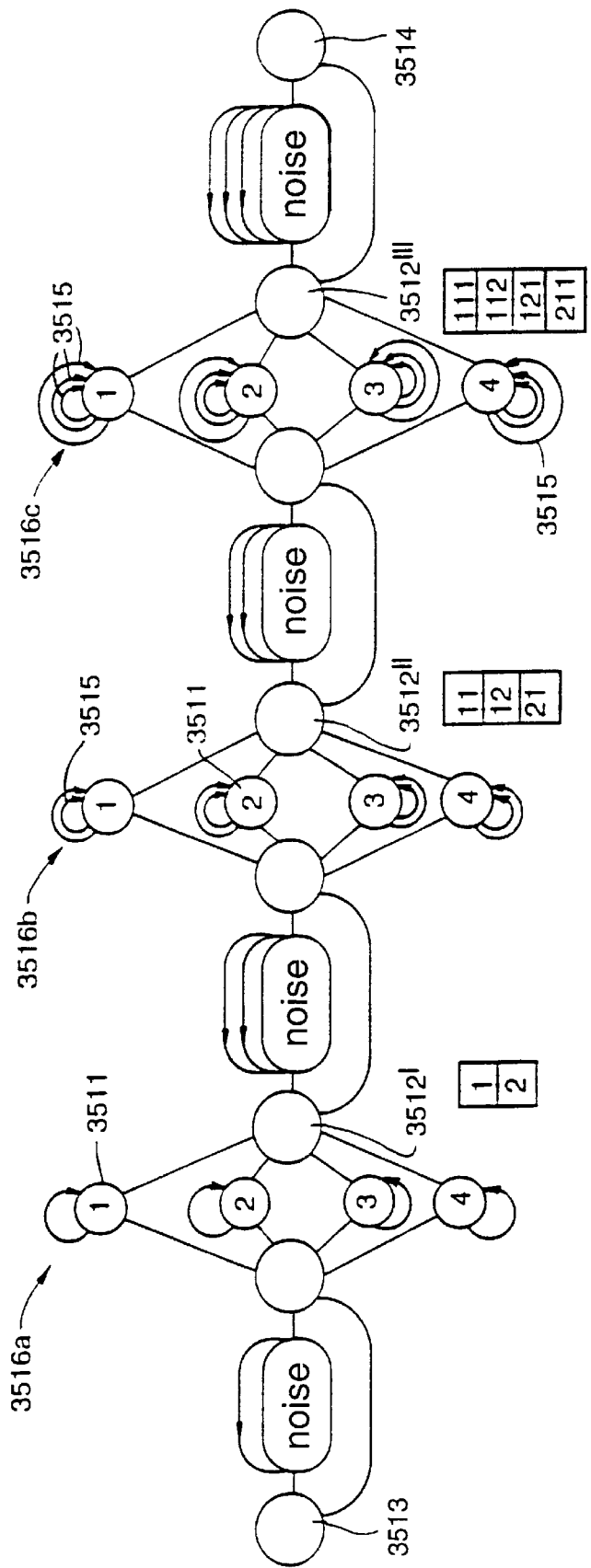
FIG. 7 is a schematic representation of a second embodiment of a recognition network applicable with the processor of the sequence parser of FIG. 4.

The tokens are propagated along paths which pass through the remaining active nodes to produce, at an output node 3514, a token indicating the score and accumulated signature, for example 121, of the path taken through the network. The tokens are continuously updated until the end of speech is determined by an end pointer 36. At this point, the partial path information or the accumulated signature of the token at the output node 3514 is examined to determine the recognition results. FIG. 7 shows a network for a speech recogniser according to a second embodiment of the invention. All of the active nodes 3511, 3517 and 3512 after and including a first decision node 3512' are each capable of processing more than one token (i.e. each vocabulary node 3511 of the second and third sets 3516*b*, 3516*c* of vocabulary nodes is associated with more than one identical word representation model 3515 and each noise node is associated with more than one identical noise model). The decision nodes 3512 are constrained in the same manner as described with reference to FIG. 6. The four tokens produced by the first set 3516*a* of vocabulary nodes 3511 are presented to the first decision node 3512', the valid set of signatures for this node being 1 and 2. All tokens having a valid signature are propagated on to the second set of vocabulary nodes 3516*b*. thus the token from the digit 1 vocabulary node 3511' and the token from the digit 2 vocabulary node 3511" are propagated onto the second set of vocabulary nodes 3516*b*. Each vocabulary node 3511 of the second set of vocabulary nodes 3516*b* is associated with two identical word representation models indicated by the loops 3515; hence the node 3511 representing the digit 1 is associated with two identical word models 3515 representing the digit 1, the node 3511" is associated with two models 3515 representing the digit 2 and so on. The two tokens propagated from the first decision node 3512' can therefore be processed by each vocabulary node 3511 of the second set 3516*b*. Thus eight (4×2) tokens may be presented to the second decision node 3512", which has a valid signature list of 12, 11 and 21. The accumulated signatures of the tokens from the second set 3516*b* are checked and the tokens having a valid signature are propagated onto the third set 3516*c* of vocabulary nodes for processing.

Each vocabulary node 3511 of the third set 3516*c* of vocabulary nodes is associated with three identical word representation models 3515. A maximum of twelve (4×3) tokens may therefore be presented to the third decision node 3512''' which has a valid signature list of 111, 112, 121 and 211. Thus four tokens having these valid signatures may be presented at the output node 3514 of the network, so allowing for the four valid paths of the apparatus to be identified and thus four alternatives of the speech deemed to be recognised to be determined. The scores of each of the tokens are compared and the highest scoring token indicates the most likely input speech.

In a preferred embodiment of the invention, the tokens which have a valid signature are sorted to retain the n top scoring paths as described in our copending European Application No. 93303538.9. A list ordered by score is maintained which may also have the added constraint that signatures be unique so that only one token for each valid signature is retained. If a second token with the same signature is presented, the better of the two is retained. For example, presuming that the following three tokens are presented to the output node 3514 during processing:

|   | SCORE | SIGNATURE |
|---|-------|-----------|
| A | 10    | 112       |
| B | 9     | 112       |
| C | 7     | 121       |

Path A, the highest scoring path, is the best match. However, although path B has the second best score, it would be rejected as an alternative parse since its signature, and hence the speech deemed to be recognised, is the same as path A. Path C would therefore be retained as the second best parse.

It will be appreciated that the network shown in FIGS. 2 and 3 is extremely simple, allowing for the recognition of a three-digit string, the recognisable digits being 1, 2, 3, 4. An operative speech recogniser is likely to have a larger recognition capability and/or the sequences to be recognised may be longer. In these cases, the number of identical word representation models associated with each relevant vocabulary node may not be determined by the list of valid accumulated signatures, but chosen to be a fixed number.

A speech recognition system according to the invention was tested using data consisting of 479 7-digit sequences, each from a separate speaker. The sequences were collected from over 1000 speakers from all regions of the UK who phoned in and, amongst other items, were each asked to read a serial number in a "natural" manner. The serial numbers were of various lengths and were generated randomly. A subset, consisting of those sequences of seven digits were selected for use in this experiment. Listening to the data confirmed that for most talkers there was a high degree of co-articulation between the digits and showed that 25% of the utterances included the word "double". In addition to the digits "one" to "nine", three versions of 0 were present, namely "zero", "nought" and "oh".

As a benchmark against which to test the signature based technique, a tree network with over 300,000 nodes was built to impose the required grammar constraints. In an unpruned form, this network will give optimal top-n-accuracy figures. However a tree network may be pruned to a certain degree without significantly affecting the accuracy of the recognition results, as can be seen from the right hand end of line 90 of FIG. 8. A tree is pruned by considering the probability of a prospective path being valid. If the probability of the prospective path being valid. If the probability of the prospective path is low, the path is pruned. For instance, if a network is configured to recognise the words CAT and DOG, and the recognition process thus far has determined that the input speech has a higher degree of similarity with the part of the network representing 'ca' than with that representing 'do', the remaining part of the tree relating to the end of the word DOG can be pruned. As can be seen from FIG. 8, the amount of pruning will, at some point, seriously affect the accuracy of the recognition results.

Figure 8:
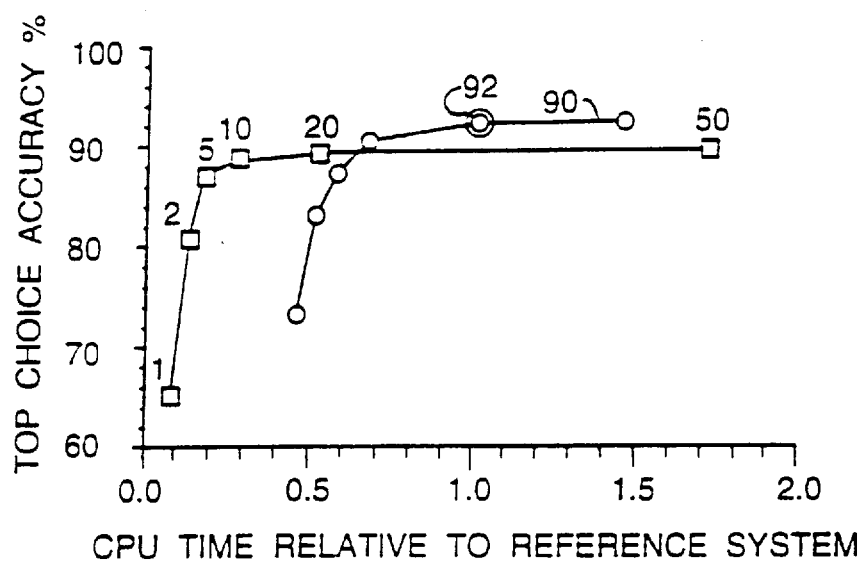
FIG. 8 is a graph showing the relative performance of a speech recognition system according to the invention compared with a prior art system.

For the purposes of comparison with a system according to the present invention, a fixed pruning threshold was chosen by selecting an operating point 92 at the top of the knee of the accuracy vs. computation curve as shown in FIG. 8, such that the accuracy was not significantly degraded.

The memory requirements of such a network are significant. If one holds just the topology of the network resident in memory, even a minimalist implementation will occupy around 8 Mb (at an average of roughly 3512 bytes per node), excluding storage for the models themselves or for the scratch spaces needed to run them.

A 7 level network, similar to that shown in FIG. 7 but with seven sets of vocabulary nodes 3511, was tested with each of the levels allowing any of the words "one" to "nine", "zero", "nought", "oh" and "double", with optional noise between each of the levels. The number of layers for the processing of alternative paths was varied.

Lists of valid signatures were generated from the list of allowed serial numbers, generating 152279 signatures for the complete and partial sequences. Using a 32-bit word to store each signature resulted in the signature lists occupying 0.6 Mb.

When processing the signatures in the network, the signatures were augmented and checked on entry to the word representation model (rather than at decision points 3512) as this prevented the processing of paths that would otherwise have been discarded at the following decision point.

FIG. 8 shows a plot of recognition accuracy versus computational load for the differing number of layers of alternative path processing. The tree network with a selected pruning threshold 92 was taken as the reference for computational load, with all the other tests related to that level. The results presented on the system according to the invention were all obtained using a network with pruning set to the same level as that used in the reference system.

It is clear from the results that the sub-optimal nature of the signature checking technique is the limiting factor in determining the maximum accuracy available from the technique. Increasing the number of layers of alternative token processing indefinitely will not bridge the gap between the accuracy of this technique and that of using the full tree network. The fundamental problem is that partial paths, which in a tree network would never meet, are in fact converging in the network of the invention and are having to compete with each other to survive. The result is that partial paths that would compete in the network of the invention before they get a chance to compete.

In situations where there is plenty of processing power available, the reduction in storage requirements is achieved at a cost in accuracy (from 92% down to 89%). On the other hand, when the processing power available is limited then a system according to the invention may offer both reduced memory requirements and increased accuracy.

In the above described embodiments, speech recognition apparatus suitable to be coupled to a telecommunications exchange has been described. However, in another embodiment, the invention may be embodied in simple apparatus connected to a conventional subscriber station (mobile or fixed) connected to the telephone network; in this case, analog-to-digital conversion means may be provided for digitising the incoming analog telephone signal.

In all cases, each network illustrating the speech to be recognised requires analysis to determine which nodes are to be assigned signatures. In addition the network is configured to be compatible with what a user is likely to say.

End of speech detection and various other aspects of speech recognition relevant to the present invention are more fully set out in the applicants' International Patent Application filed on 25$^{th}$ Mar. 1994 entitled "Speech Recognition", claiming priority from European patent application No. 93302541 (corresponding to U.S. application Ser. No. 08/525,730 filed Dec. 19, 1995), which is herein incorporated by this reference.

We claim:

1. A token-passing speech recognition system for recognising connected speech, the recognition system comprising:
   a network for modelling expected input speech, said network having a plurality of vocabulary nodes, at least one of the vocabulary nodes having an associated signature, and
   means for examining partial recognition paths at decision nodes intermediate the beginning and end of the recognition path, each decision node having an associated set of valid accumulated signatures, wherein a token received by a decision node is only propagated if the accumulated signature of that token reflecting the path of said token through the network is one of those in the set of valid accumulated signatures associated with that decision node.

2. A speech recognition system as in claim 1 further including:
   comparing means for comparing the score and signature of each token, to determine the path through the network with the best match to the input speech signal and those with the next best alternative matches.

3. A speech recognition system as in claim 2 wherein the scores of the tokens are compared at each decision node of the network, only the n top scoring tokens having valid signatures being propagated to the next nodes(s), where n is greater than one.

4. A speech recognition system as in claim 1 wherein the vocabulary nodes are associated with Hidden Markov Models and/or dynamic time warping.

5. A speech recognition system as in claim 1 wherein at least one of the vocabulary nodes of the network is associated with more than one identical word representation model.

6. A speech recognition system as in claim 5 wherein the best scoring path is processed by the first word representation model of a vocabulary node, the next best by the second and so on until either parallel models or incoming paths run out.

7. A speech recognition system as in claim 1 wherein the connected speech deemed to be recognised is determined by tracing the pointers of the tokens back through the network.

8. A speech recognition system as in claim 1 wherein the signatures are compared to determine both the path with the best match to the input speech signal and that with the second best alternative match.

9. A speech recognition system comprising:
   a network for modelling expected input speech, the network having a plurality of vocabulary nodes for processing input speech, each vocabulary node being associated with at least one word representation model operable to produce a first parameter indicating the degree of similarity between the input speech and speech deemed to be recognised;
   comparing means for comparing the first parameters from distinct word representation models and, in response to this comparison, for determining the parameter to be propagated through the network;
   means for determining, at an output of the network, the parameter having the highest degree of similarity and the input speech deemed to be recognised;
   means for allocating a signature to at least one of the vocabulary nodes;
   means for associating with each first parameter a second parameter representing the accumulated signatures of a path through the network; and
   validation means for validating that the second parameter associated with a first parameter is included in a valid set of second parameters, the first parameters being propagated through the network only when the associated second parameter is one of those in a set of valid second parameters.

10. A speech recognition system as in claim 9 wherein the second parameter validation means are operable to validate the second parameter after the input speech is processed by a word representation model of a vocabulary node.

11. A speech recognition system as in claim 9 wherein the speech deemed to be recognised is determined from the second parameter associated with the first parameter available at the output indicating the highest degree of similarity.

12. A speech recognition system as in claim 9 wherein at least one of the vocabulary nodes is associated with more than one identical word representation model.

13. A speech recognition system as in claim 12 wherein the comparing means propagates a maximum of n first parameters having the highest degrees of similarity, n being an integer greater than one.

14. A speech recognition system as in claim 9 adapted to recognise connected strings of spoken numerical digits.

15. A speech recognition system as in claim 9 comprising a programmed digital signal processing chip.

16. A speech recognition system as in claim 9 connected with a telecommunications network.

17. A method of recognising connected input speech, said method comprising.
   generating a network for modelling expected input speech, the network having a plurality of vocabulary nodes, each vocabulary node being associated with at least one word representation model capable of producing a first parameter indicating the degree of similarity between the input speech and the speech deemed to be recognised;
   comparing the first parameters from distinct word representation models and, in response to this comparison, determining which parameters are to be propagated through the network;
   determining, at an output of the network, the parameter having the highest degree of similarity and the input speech deemed to be recognised;
   allocating a signature to at least one of the vocabulary nodes; and
   associating with the first parameters second parameters representing the accumulated signatures of a path through the network, the first parameters being propagated through the network only when the associated second parameter is one of those in a set of valid second parameters.

18. A method as in claim 17 wherein the second parameters are validated after processing by a word representation model associated with each vocabulary node.

19. A method as in claim 17 wherein a maximum of n first parameters having the highest degrees of similarity are propagated from a common point of the network, n being an integer greater than one.

20. A method as in claim 17 wherein the second parameter associated with a first parameter available at the output having the highest degree of similarity indicates the input speech deemed to be recognised.

21. A method as in claim 17 wherein, when more than one first parameter is available at the output, the first parameters and the associated second parameters available at the output are compared and the first parameters which have the highest degree of similarity and different associated second parameters are retained.

22. A token-passing speech recognition method for recognising connected speech, the recognition method comprising:

modelling expected input speech using a network having a plurality of vocabulary nodes, at least one of the vocabulary nodes having an associated signature, and partial recognition paths at decision nodes intermediate the beginning and end of the recognition path, each decision node having an associated set of valid accumulated signatures, wherien a token received by a decision node is only propagated if the accumulated signature of that token reflecting the path of said token through the network is one of those in the set of valid accumulated signatures associated with that decision node.

23. A speech recognition method as in claim 22 further including:

comparing the score and signature of each token, to determine the path through the network with the best match to the input speech signal and those with the next best alternative matches.

24. A speech recognition method as in claim 23 wherein the scores of the tokens are compared at each decision node of the network, only the n top scoring tokens having valid signatures being propagated to the next nodes(s), where n is greater than one.

25. A speech recognition method as in claim 22 wherein the vocabulary nodes are associated with Hidden Markov Models and/or dynamic time warping.

26. A speech recognition method as in claim 22 wherein at least one of the vocabulary nodes of the network is associated with more than one identical word representation model.

27. A speech recognition method as in claim 26 wherein the best scoring path is processed by the first word representation model of a vocabulary node, the next best by the second and so on until either parallel models or incoming paths run out.

28. A speech recognition method as in claim 22 wherein the connected speech deemed to be recognised is determined by tracing the pointers of the tokens back through the network.

29. A speech recognition method as in claim 22 wherein the signatures are compared to determine both the path with the best match to the input speech signal and that with the second best alternative match.

* * * * *